(12) United States Patent
Suita

(10) Patent No.: US 7,588,356 B2
(45) Date of Patent: Sep. 15, 2009

(54) STRUCTURE OF TAIL LIGHT FOR MOTORCYCLE

(75) Inventor: Yoshikazu Suita, Samutprakarn (TH)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 11/971,175

(22) Filed: Jan. 8, 2008

(65) Prior Publication Data

US 2008/0205073 A1    Aug. 28, 2008

Related U.S. Application Data

(60) Provisional application No. 60/892,194, filed on Feb. 28, 2007.

(51) Int. Cl.
*B62J 6/04* (2006.01)

(52) U.S. Cl. .................. 362/473; 362/497; 362/541

(58) Field of Classification Search .................. 362/473, 362/497, 498, 499, 540, 541, 542, 268
See application file for complete search history.

(56) References Cited

U.S. PATENT DOCUMENTS

| | | | | |
|---|---|---|---|---|
| 2,057,249 A | * | 10/1936 | Rioux | 362/497 |
| 2,190,862 A | * | 2/1940 | Condon | 362/498 |
| 2,291,777 A | * | 8/1942 | Wahlberg | 362/497 |
| 4,153,928 A | * | 5/1979 | Speedy | 362/541 |
| 4,674,014 A | * | 6/1987 | Takatsuji et al. | 362/497 |
| 7,559,679 B2 | * | 7/2009 | Isayama et al. | 362/473 |

FOREIGN PATENT DOCUMENTS

| | | | |
|---|---|---|---|
| JP | 52069137 A | * | 6/1977 |
| JP | 4-49536 | | 4/1992 |

* cited by examiner

*Primary Examiner*—Y My Quach Lee
(74) *Attorney, Agent, or Firm*—Hogan & Hartson LLP

(57) ABSTRACT

A tail light unit for a vehicle with a bulb that is not visible without decreased visual recognizability from the rear. A light blocking wall covers the bulb such that the bulb is not visible from the rear. An emission region provided outside the light blocking wall allows light emitted from the bulb to be seen from the rear.

7 Claims, 8 Drawing Sheets

STRUCTURE OF TAIL LIGHT FOR MOTORCYCLE

RELATED APPLICATIONS

This application claims the benefit of priority under 35 USC 119(e) of U.S. provisional application No. 60/892,194, filed on Feb. 28, 2007, which application is hereby incorporated by reference in its entirety.

BACKGROUND OF THE INVENTION

1. Field of the Invention

The present invention relates to a tail light unit for a vehicle that includes an external casing supporting a bulb and a lens covering an opening formed on the external casing and opened to the rear of the vehicle.

2. Description of Related Art

A typical tail light unit includes a housing containing a bulb as a light source for emitting light and a lens attached to a rear opening of the housing to release the light from the bulb toward the rear of the vehicle. See, for example, the tail light unit disclosed in JP-UM-A-4-49536.

The bulb of this tail light unit is directly visible from the rear of the vehicle through the lens. Thus, the vehicle including this tail light unit tends to have a simple and commonplace external appearance in design.

SUMMARY OF THE INVENTION

The present invention provides a tail light unit having a bulb that is not visible from the rear of the vehicle, without decreasing visual recognizability, thereby improving the external appearance of the vehicle.

A tail light unit according to the invention includes a bulb that emits light and an external casing that supports the bulb. A lens covers an opening formed on the external casing and opened to the rear of the vehicle. A light blocking wall covers the bulb such that the bulb is not visible from the rear of the vehicle. An emission region that allows light emitted from the bulb to be seen from the rear of the vehicle is provided outside the light blocking wall.

According to the invention, the bulb is covered by the light blocking wall such that is not visible from the rear of the vehicle, but light emitted from the bulb can still be seen through the emission region provided outside the light blocking wall. This design is novel and original design different relative to related-art bulb emission type structures, and provides an external appearance that is not monotonous.

In one embodiment, the emission region is disposed above the light blocking wall. A number emission region is also provided that guides light emitted from the bulb toward a number plate provided below the light blocking wall.

According to this embodiment, where an emission region is disposed above the light blocking wall and a number emission region is disposed below the light blocking wall, light comes not through the central area where the bulb is positioned but through the areas above and below the bulb. This structure provides an external appearance that is not monotonous, and allows the one bulb to illuminate the number plate as well.

In one embodiment, an emission portion that allows light emitted from the bulb to be seen from the rear of the vehicle is provided on the light blocking wall.

According to this embodiment, light passing through the emission portion provided on the light blocking wall creates a contrast between brightness and darkness that makes a strong impression on an observer and offers a considerable advantage in design.

In one embodiment, the emission portion has a circular shape having a diameter smaller than the bulb diameter or a slit shape having a small width.

According to this embodiment, the circular or slit shape further emphasizes the contrast between brightness and darkness produced by light passing through the emission portion, resulting in improved product image.

In one embodiment, a reflection portion that reflects light coming from the rear is provided on the light blocking wall.

According to this embodiment, the reflection portion clearly reflects light from the rear of the vehicle, thereby increasing visual recognizability from the rear.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
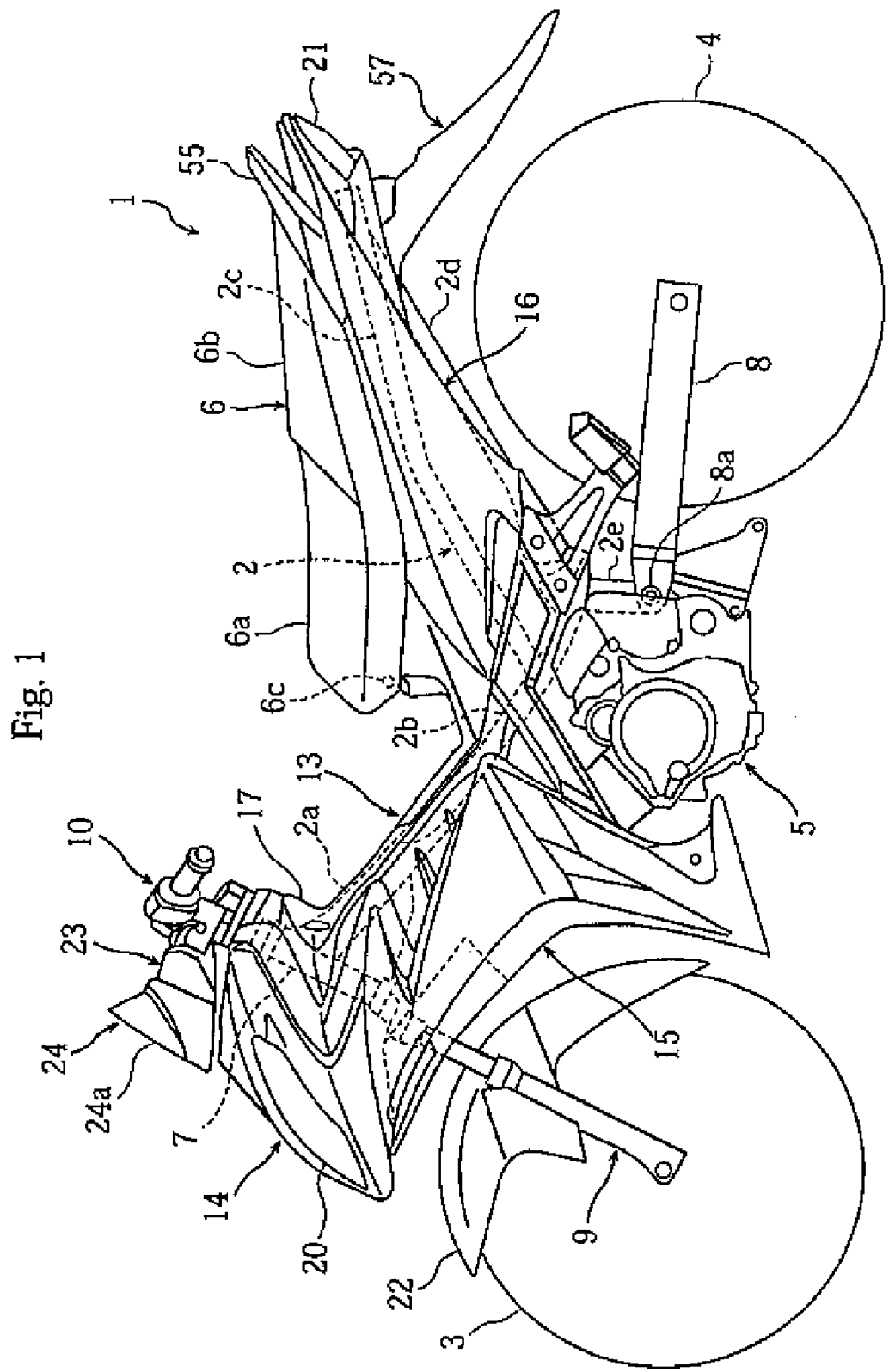
FIG. 1 is a side view of a motorcycle including a tail light unit according to an embodiment of the invention.
Figure 2:
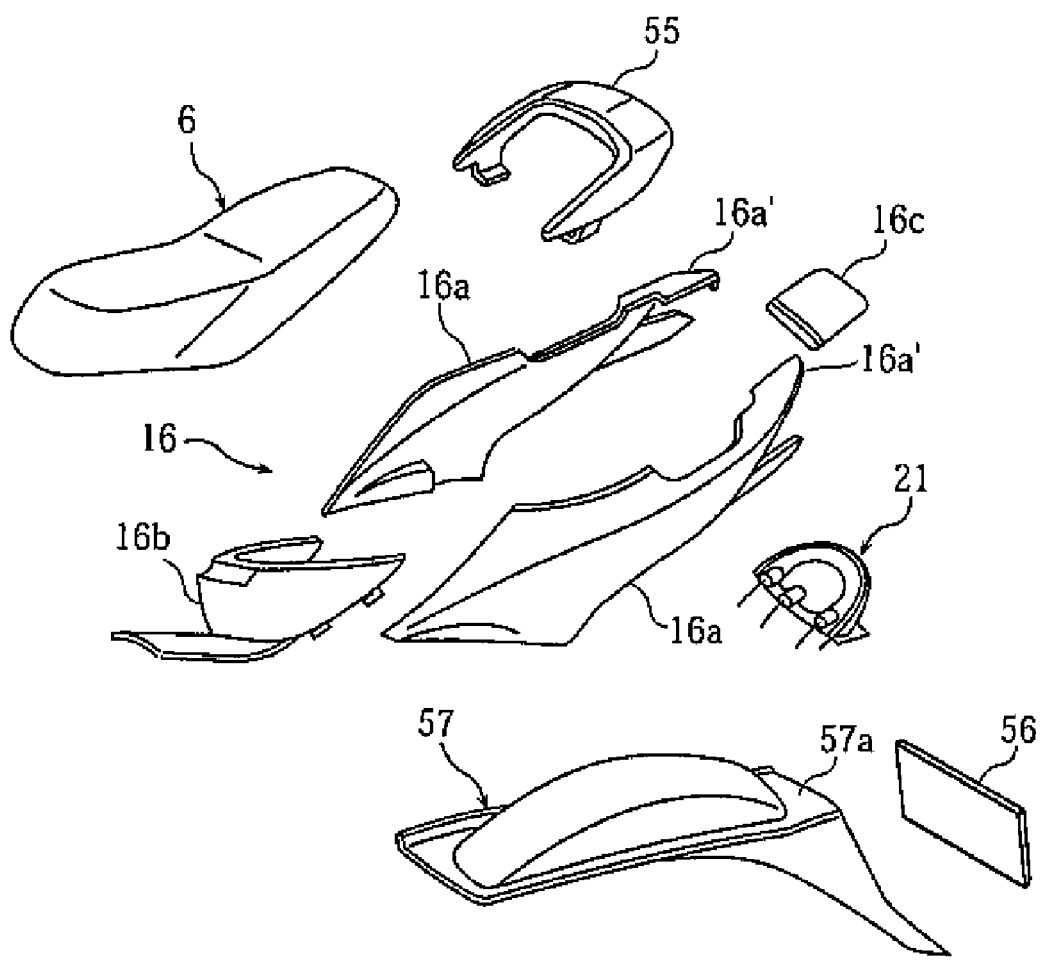
FIG. 2 is a perspective view of a disassembled side cover on which the tail light unit is disposed.

An embodiment of the invention is now described with reference to the drawings. FIGS. 1-11 depict a tail light unit for a vehicle according to the invention. The front, rear, left and right directions in the following description are from the perspective of a rider sitting on a seat.

A motorcycle 1 has an under-bone-type body frame 2, a front wheel 3 disposed at the front end of body frame 2, a rear wheel 4 disposed at the rear end of body frame 2, an engine 5 mounted below body frame 2, and a straddle-type seat 6 disposed above body frame 2.

Body frame 2 has a head pipe 7 positioned at its front end. A main frame 2a extends diagonally downward to the rear from head pipe 7. Left and right down tubes 2b extend diagonally downward to the rear from main frame 2a while expanding toward the outside in the vehicle width direction. Left and right seat rails 2c extend diagonally upward to the rear from rear ends of down tubes 2b. Left and right seat stays 2d connect rear ends of seat rails 2c and down tubes 2b.

A rear arm bracket 2e is connected to the rear ends of down tubes 2b and extends downward. A rear arm 8 supported by rear arm bracket 2e via a pivot shaft 8a can swing upward and downward. Rear wheel 4 is supported by the rear end of rear arm 8.

Head pipe 7 supports a front fork 9 that can be steered to the left and right. Front wheel 3 is supported by the lower end of front fork 9. A steering handle 10 is fixed to the upper end of front fork 9.

A meter unit 23 including a speed meter, a fuel meter, a signal lamp and the like is provided in front of steering handle 10. A meter cover 24 covers a front region of meter unit 23. A visor 24a that guides wind generated by running of motorcycle 1 to an area above the rider is provided on meter cover 24.

Seat 6 is mounted on seat rails 2c. Seat 6 includes a main seat 6a on which the rider sits formed integrally with a tandem seat 6b on which the tandem rider sits. Seat 6 is rotatable upward and downward around a front hinge 6c. A battery, fuel tank, storage box and the like are disposed below seat 6.

Engine 5 is a water-cooled-type four-stroke engine, and is suspended by down tubes 2b. Revolutions of engine 5 are transmitted to rear wheel 4 via a power transmission component such as a chain.

Body frame 2 is covered by a body cover 13. Body cover 13 has a front cover 14 that covers an area forward of head pipe 7, an inner cover 17 that covers an area behind head pipe 7, a leg shield 15 that covers front regions of the legs of a rider, and a side cover 16 that covers a peripheral area below seat 6. A head light unit 20 is disposed on front cover 14. A tail light unit 21 is positioned on the rear end of side cover 16.

Side cover 16 has left and right side cover portions 16a that cover left and right lower sides of seat 6, a front side cover portion 16b that covers a front area below seat 6, and a tail cover portion 16c that covers an area above rear ends 16a' of left and right side cover portions 16a.

A rear fender 57 covering an area above rear wheel 4 is provided on lower surfaces of left and right side cover portions 16a. A number plate 56 is disposed on the back surface of rear fender 57. A grab bar 55 surrounds the rear end of seat 6.

The periphery of tail light unit 21 is surrounded by rear ends 16a' of left and right side cover portions 16a, tail cover portion 16c, and a rear end 57a of rear fender 57 substantially with no clearance left between these components. Number plate 56 is disposed below tail light unit 21.

Tail light unit 21 is approximately triangular as viewed from the rear of the vehicle, having an approximately linear lower side and a circular-arc-shaped oblique line. Tail light unit 21 has a tail light 21a disposed at the center in the vehicle width direction, and left and right winker lights 21b disposed on left and right sides. Lights 21a and 21b are formed integrally with each other.

Tail light 21a has a bulb 60 as a light source for emitting light, a housing (external casing) 61 for supporting bulb 60, and a transparent lens 62 attached to cover a lens opening 61a formed on housing 61 and opened to the rear of the vehicle. Winker lights 21b have winker bulbs 63 as light sources for emitting light, housing 61 common to tail light 21a for supporting the respective winker bulbs 63, and lens 62 common to tail light 21a for covering lens opening 61a of housing 61.

Housing 61 has a tail reflector casing 61b which is substantially bowl-shaped and opened to the rear, and left and right winker reflector casings 61c opened to the rear and the sides. Casings 61b and 61c are formed integrally with each other. Bulb 60 is detachably attached to the bottom of tail reflector casing 61b, and winker bulbs 63 are detachably attached to the bottoms of left and right winker reflector casings 61c.

Figure 10:
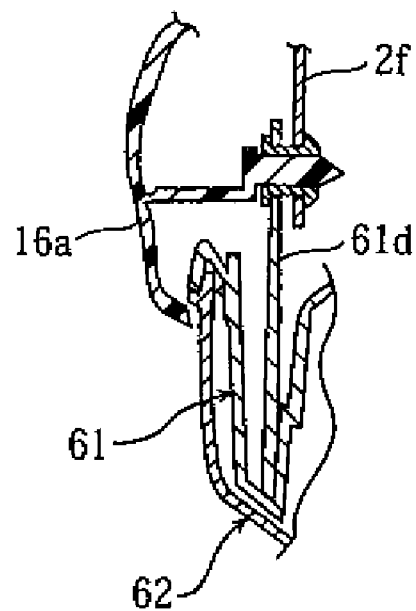
FIG. 10 is a plan cross-sectional view of a body attachment portion of the tail light unit taken through line X-X of FIG. 3.
Figure 11:
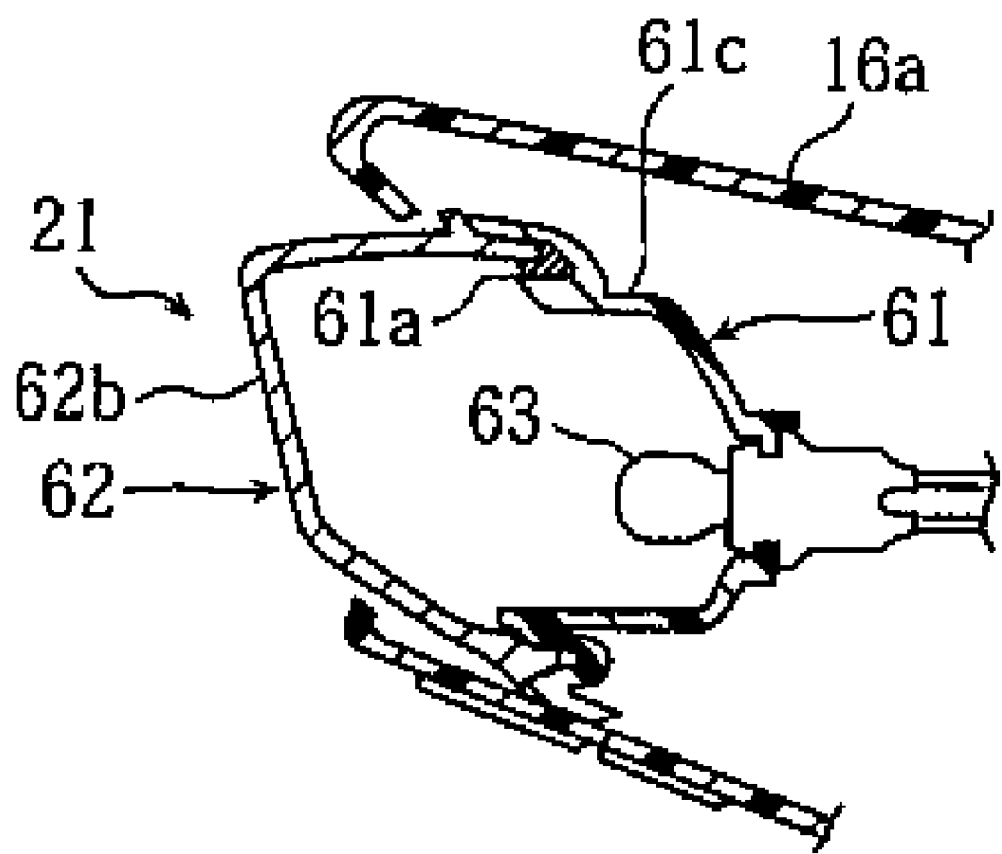
FIG. 11 is a side cross-sectional view of a winker lamp of the tail light unit taken through line XI-XI of FIG. 3.

A pair of left and right attachment pieces 61d project to the front from housing 61. Attachment pieces 61d are fixed to a tail bracket 2f with left and right side cover portions 16a (FIG. 10). Tail bracket 2f extends between and is fixed to left and right seat rails 2c.

Figure 6:
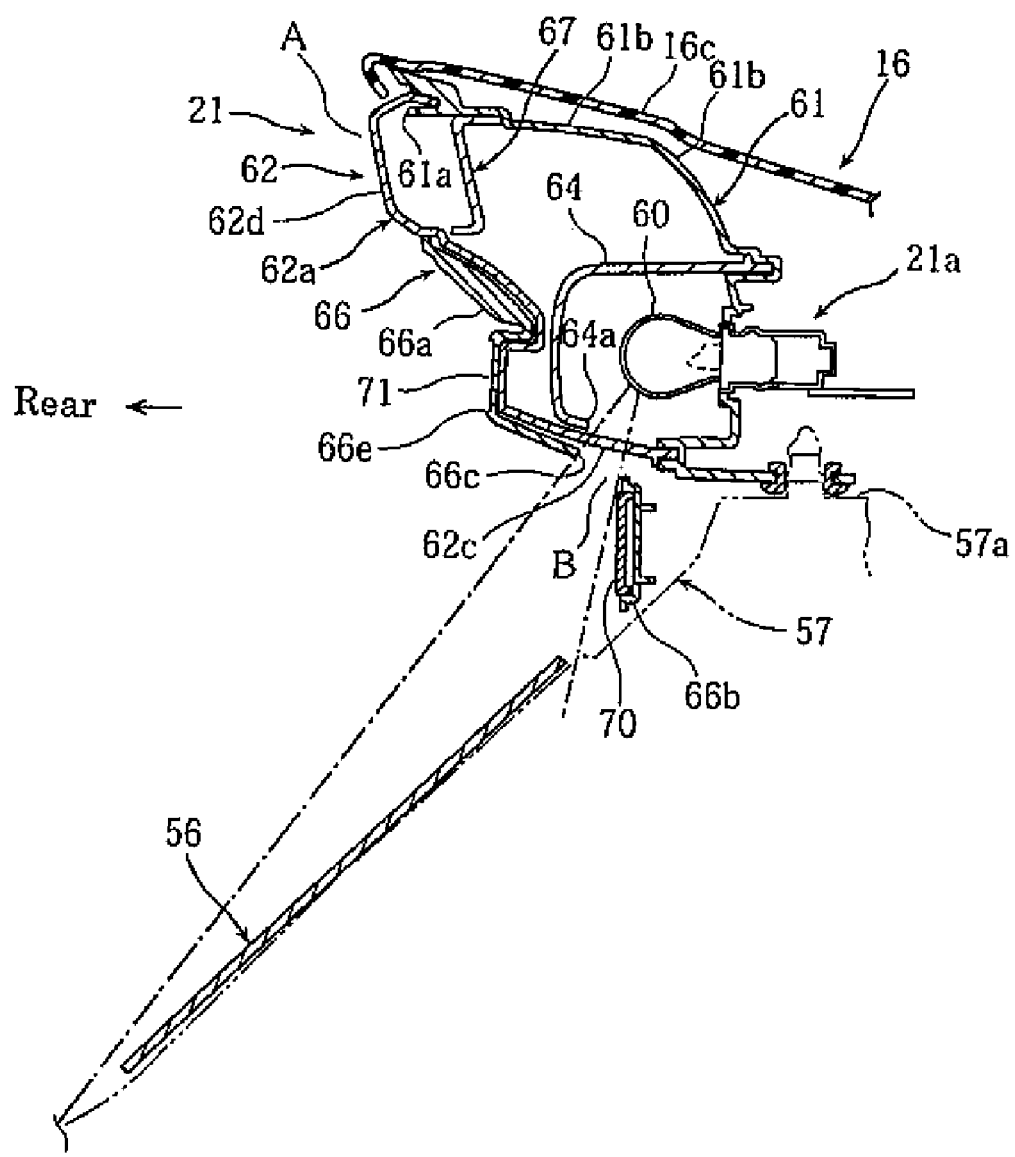
FIG. 6 is a side cross-sectional view of the tail light unit taken through line VI-VI of FIG. 3.
Figure 8:
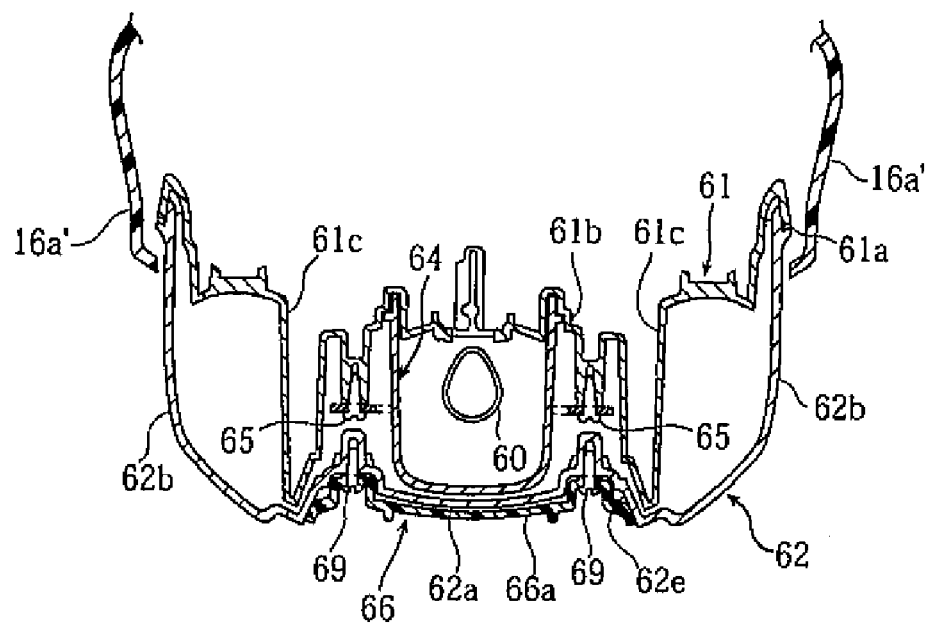
FIG. 8 is a plan cross-sectional view of the tail light unit taken through line VIII-VIII of FIG. 3.
Figure 9:
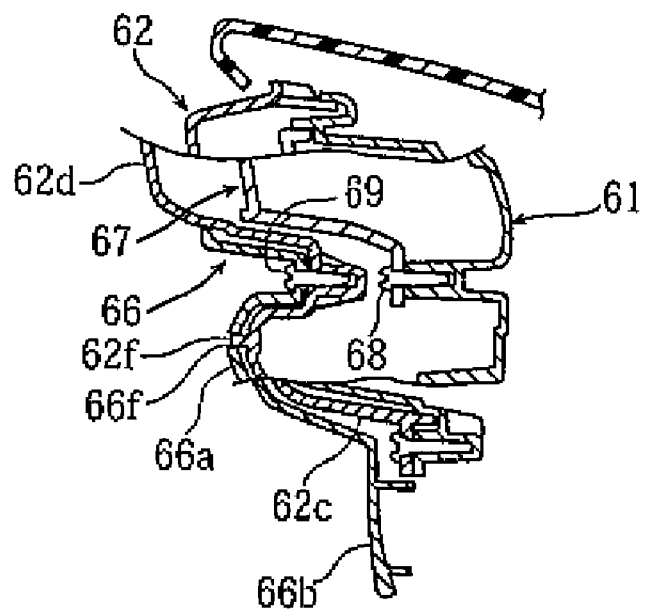
FIG. 9 is a side cross-sectional view of the tail light unit taken through line IX-IX of FIG. 3.

An inner lens 64 covers bulb 60. In one embodiment, inner lens 64 is colored in red. Inner lens 64 is fixed to housing 61 by a plurality of screws 65 (FIGS. 8 and 9). An emission hole 64a for guiding light emitted from bulb 60 toward number plate 56 through lens 62 is formed through the bottom wall of inner lens 64 (FIG. 6).

Lens 62 engages with the opening edge of housing 61. A tail lens section 62a covers the opening of tail reflector casing 61b from the rear. Left and right winker lens sections 62b extend from left and right edges of tail lens section 62a toward the front to cover the openings of winker reflector casings 61c from the rear and sides. A bottom lens section 62c extends from the lower edge of tail lens section 62 toward the front to cover the opening of tail reflector casing 61b from below.

An upper side 62d of tail lens section 62a has a circular arc shape extending along the upper side of housing 61. An emission lens 67 is disposed inside and opposed to upper side 62d. Emission lens 67 is fixed to housing 61 by screws 68 (FIG. 9).

Figure 3:
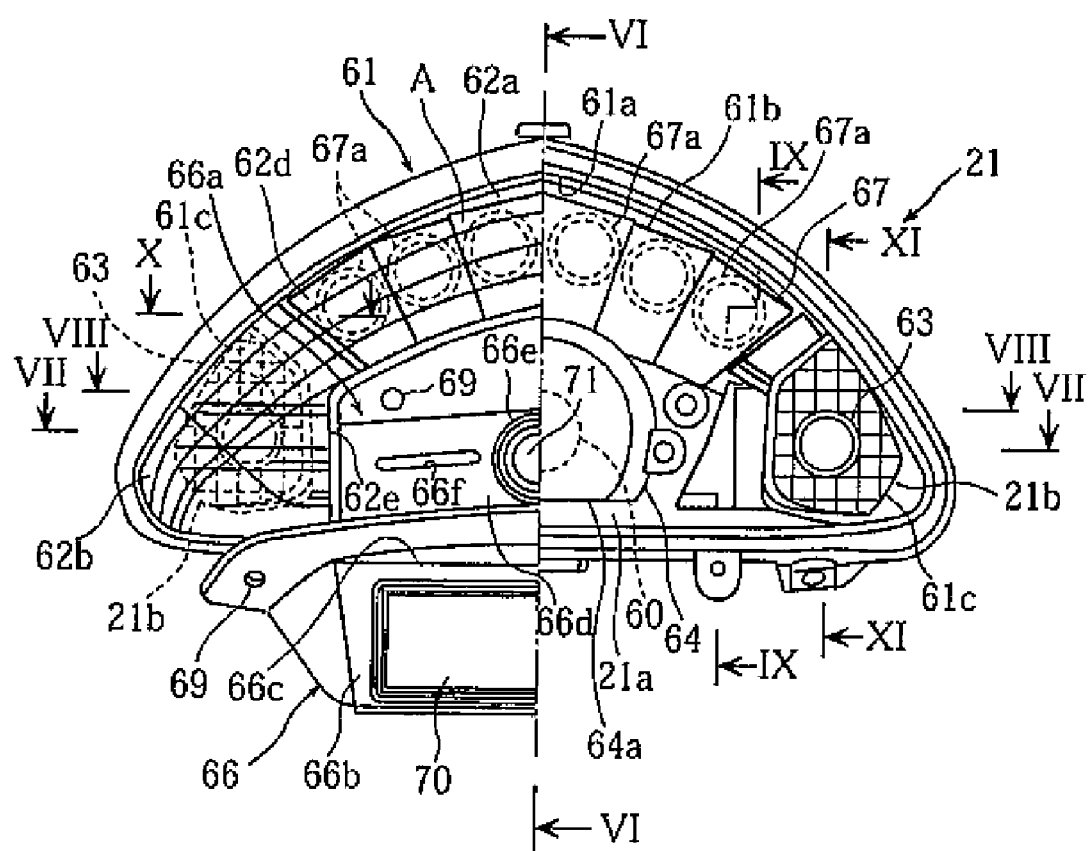
FIG. 3 is a back view of the tail light unit.
Figure 4:
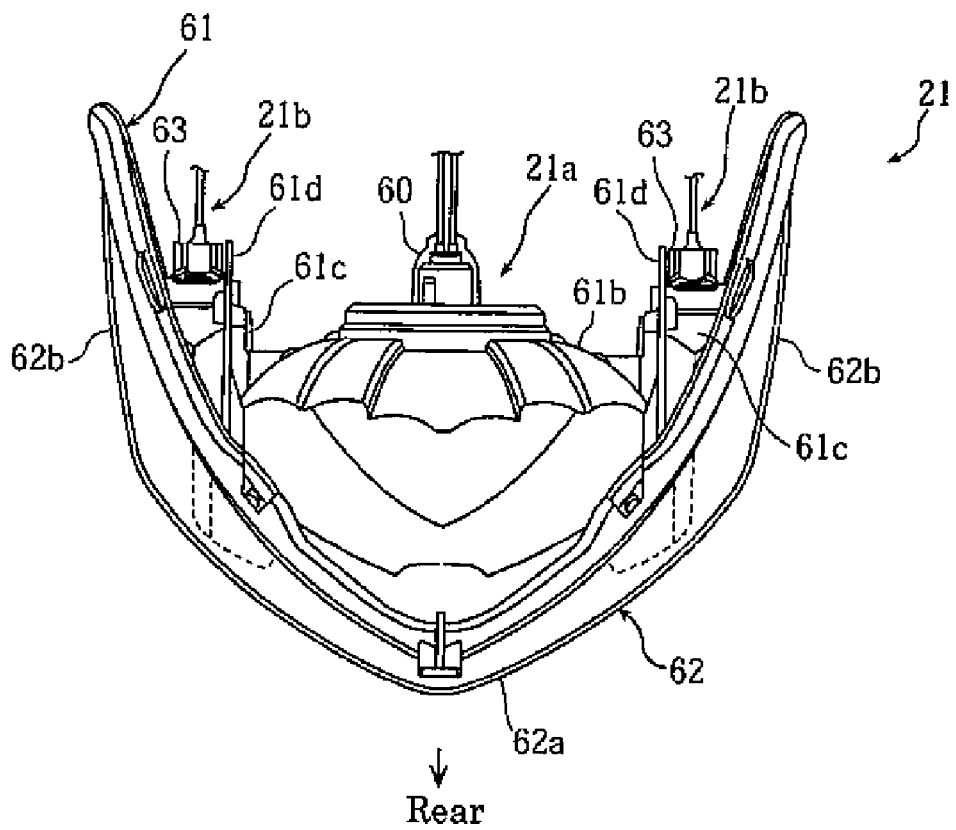
FIG. 4 is a plan view of the tail light unit.
Figure 5:
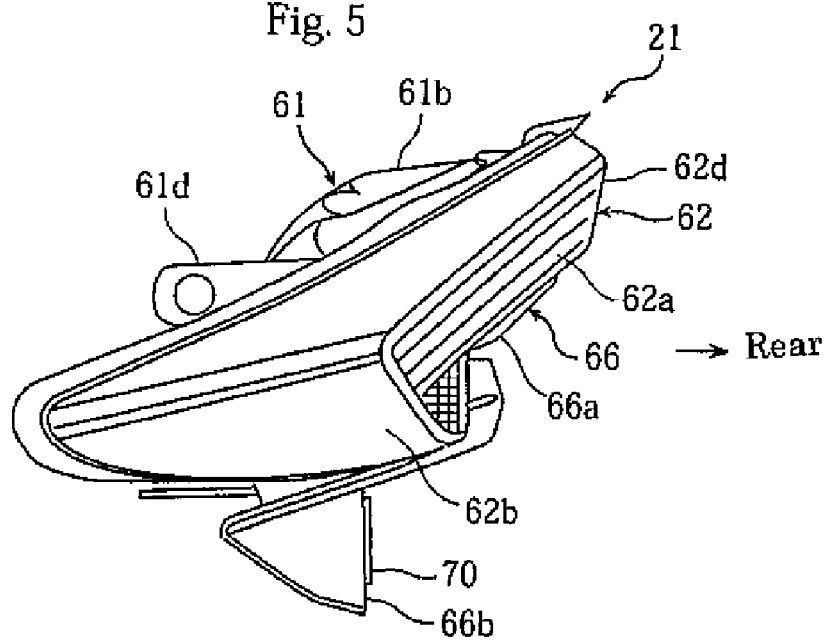
FIG. 5 is a side view of the tail light unit.

Circular emission sections 67a are formed on emission lens 67 with a predetermined clearance left between one another in the vehicle width direction (FIG. 3). Light from bulb 60 is released through emission sections 67a and upper side 62d toward the rear, thereby providing an external appearance that looks as if an LED is emitting light.

A light blocking plate 66 having a non-transparent color is provided on the back surface of lens 62 to cover bulb 60 such that bulb 60 is not visible from the rear of the vehicle. Tail lens section 62a has a concave 62e sized to accommodate light blocking plate 66. Light blocking plate 66 is disposed within concave 62e in such a position as to form a substantially continuous surface from the outer surface of lens 62, and is fixed to lens 62 by screws 69.

Light blocking plate 66 has a light blocking main body 66a covering the lower central area of lens 62 except for upper side 62d of tail lens section 62a and left and right winker lens sections 62c, and a lower light blocking portion 66b extending downward from light blocking main body 66a to cover the lower area of lens 62.

Light blocking plate 66 produces an emission region A which allows upper side 62d of lens 62 above light blocking main body 66a to release light from bulb 60 toward the rear of the vehicle. An emission opening 66c is formed between light blocking main body 66a and lower light blocking portion 66b. Emission opening 66c produces a number emission region B for guiding light from bulb 60 toward number plate 56.

A reflection plate 70 for reflecting light coming from the rear of the vehicle is attached to lower light blocking portion 66b. Lower light blocking portion 66b is shifted toward the front such that reflection plate 70 can be positioned outside number emission region B. This structure allows only reflection of light coming from the rear of the vehicle and prevents reflection of light emitted from bulb 60.

Figure 7:
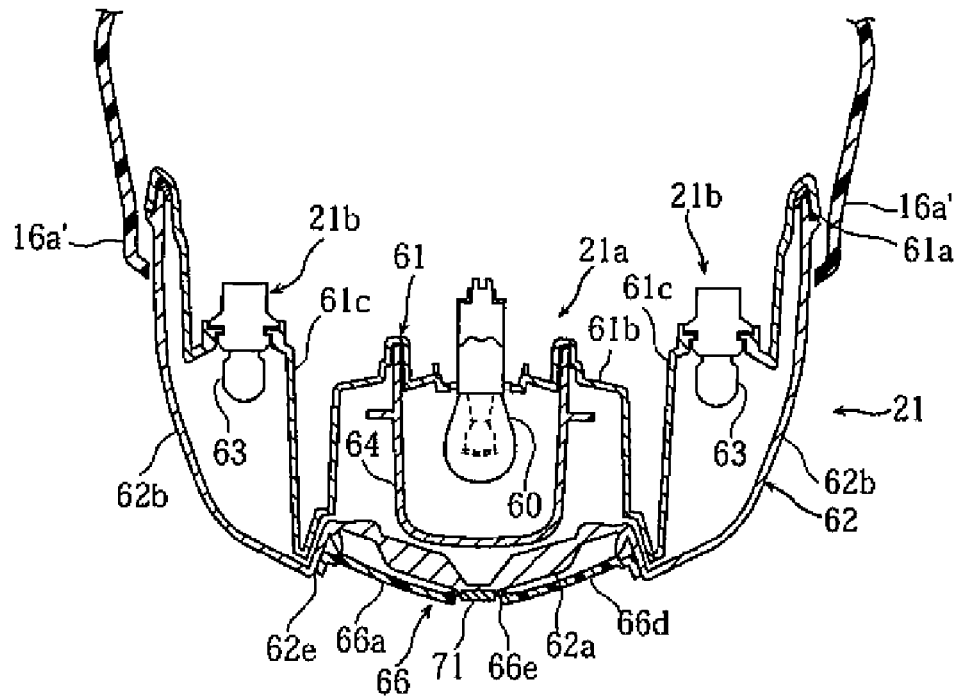
FIG. 7 is a plan cross-sectional view of the tail light unit taken through line VII-VII of FIG. 3.

Light blocking main body 66a has a vertical wall 66d opposed to bulb 60 in the vehicle front-rear direction. A circular emission portion 66e is provided at the center of vertical wall 66d in the vehicle width direction (FIG. 7). Emission portion 66e has a diameter smaller than the outside diameter of bulb 60.

A circular plate 71 is attached to emission portion 66e. Circular plate 71 is supported by lens 62. In one embodiment, circular plate 71 has a slit logo mark, which provides circular plates 71 with an external appearance of standing out by the light emitted from bulb 60 and passing through the slit on circular plate 71.

Left and right emission portions 66f linearly extending in the vehicle width direction and having a small width are provided on left and right sides of vertical wall 66d. A convex 62f formed on lens 62 is inserted into each emission portion 66f (see FIG. 9) and has an external appearance of an LED emitting light.

According to this embodiment, light blocking plate 66 disposed at the back surface of lens 62 covers bulb 60 such that bulb 60 is not visible from the rear of the vehicle. Emission region A allows upper side 62d of lens 62 above light blocking plate 66 to release light from bulb 60 that can be seen from the rear of the vehicle. Thus, bulb 60 is not visible while still securing visual recognizability from the rear of the vehicle. This design is novel and original relative to related-art bulb emission type structures, and provides an external appearance that is not monotonous.

According to this embodiment, emission region A is disposed above light blocking plate 66, and number emission region B for guiding light from bulb 60 toward number plate 56 is disposed below light blocking plate 66. Thus, light comes not through the central area where bulb 60 is positioned but through areas above and below light blocking plate 66. This structure provides an external appearance that is not monotonous and allows the one bulb 60 to illuminate number plate 56 as well.

According to this embodiment, slit central emission portion 66e and left and right emission portions 66f allowing light from bulb 60 to be seen from the rear of the vehicle are formed on light blocking plate 66. Thus, the contrast between the brightness and darkness produced by light passing through respective emission portions 66e and 66f makes a strong impression on an observer and offers a considerable advantage in design.

According to this embodiment, the diameter of central emission portion 66e is smaller than the bulb diameter, and circular plate 71 having the slit logo mark is disposed on central emission portion 66e. Thus, the contrast between the brightness and darkness produced by light having passed through circular plate 71 is further emphasized, resulting in improved product image.

According to this embodiment, reflection plate 70 for reflecting light coming from the rear is provided on light blocking plate 66. This structure allows light from the rear of the vehicle to be clearly reflected and thereby improves visual recognizability from the rear increases.

While light blocking plate 66 is formed separately from lens 62 in this embodiment, the lens may alternatively be colored to produce a light blocking portion formed integrally with the lens.

While a tail light unit disposed on a motorcycle has been discussed in this embodiment, the tail light unit is applicable to other vehicles such as automobiles.

The particular embodiments of the invention described in this document should be considered illustrative, rather than restrictive. Modification to the described embodiments may be made without departing from the spirit of the invention as defined by the following claims.

The invention claimed is:

1. A tail light unit for a vehicle, comprising:
   a bulb that emits light;
   an external casing that supports the bulb;
   a first lens that covers an opening formed on the external casing and opened to a rear of the vehicle, wherein
   a light blocking wall that is formed separately from the first lens and that is fixed to the first lens by a fastener covers the bulb such that the bulb is not visible from the rear of the vehicle, and
   an emission region that allows light emitted from the bulb to be seen from the rear of the vehicle is provided outside the light blocking wall; and
   a second lens in the emission region through which said light emitted from the bulb is visible.

2. The tail light unit for a vehicle according to claim 1, wherein:
   the emission region is disposed above the light blocking wall; and
   a number emission region that guides light emitted from the bulb toward a number plate is provided below the light blocking wall.

3. The tail light unit for a vehicle according to claim 1, wherein an emission portion that allows light emitted from the bulb to be seen from the rear of the vehicle is provided on the light blocking wall.

4. The tail light unit for a vehicle according to claim 3, wherein the emission portion has a circular shape having a diameter smaller than a bulb diameter or a slit shape having a small width.

5. The tail light unit for a vehicle according to claim 1, wherein a reflection portion that reflects light coming from the rear is provided on the light blocking wall.

6. A vehicle comprising the tail light unit according to claim 1.

7. The vehicle according to claim 6, wherein the vehicle is a motorcycle.

* * * * *